United States Patent [19]
Aoyama et al.

[11] Patent Number: 5,581,379
[45] Date of Patent: Dec. 3, 1996

[54] RECTANGULAR BASED CONVEX MICROLENSES SURROUNDED WITHIN A FRAME AND METHOD OF MAKING

[75] Inventors: Shigeru Aoyama, Kyoto; Osamu Nishizaki; Takeshi Kurahashi, both of Takatsuki, all of Japan

[73] Assignee: Omron Corporation, Japan

[21] Appl. No.: 308,640

[22] Filed: Feb. 15, 1994

[30] Foreign Application Priority Data

Feb. 15, 1993 [JP] Japan .................................. 5-047172

[51] Int. Cl.$^6$ ..................... G02F 1/1335; G03B 21/60; G02B 27/10
[52] U.S. Cl. ..................... 349/5; 349/57; 349/95
[58] Field of Search ..................... 359/454–459, 359/619–628, 40–41, 900

[56] References Cited

U.S. PATENT DOCUMENTS

| | | | |
|---|---|---|---|
| 4,689,291 | 8/1987 | Popovic et al. | 359/900 |
| 4,929,569 | 5/1990 | Yaniv et al. | 359/60 |
| 5,151,801 | 9/1992 | Hiroshima | 359/40 |
| 5,239,412 | 8/1993 | Naka et al. | 359/622 |
| 5,298,366 | 3/1994 | Iwasaki et al. | 359/900 |
| 5,300,263 | 4/1994 | Hoopman et al. | 264/2.5 |
| 5,359,440 | 10/1994 | Hamada et al. | 359/41 |

FOREIGN PATENT DOCUMENTS

| | | | |
|---|---|---|---|
| 409618 | 1/1991 | European Pat. Off. | 359/41 |

*Primary Examiner*—Anita Pellman Gross
*Assistant Examiner*—Walter J. Malinowski
*Attorney, Agent, or Firm*—Klima & Hopkins, P.C.

[57] ABSTRACT

A microlens array including a plurality of spaced apart individual microlens in a plane defining a plurality of spaced apart apertures through the plane. The use of non-circular apertures in a preferred embodiment greatly increases the effective lens ration. This microlens array provides a dust-resistant optical element, and reduces the probability of flat spots resulting from an AR coating and problem associated with the edge effect resulting from electrolytic plating.

19 Claims, 14 Drawing Sheets

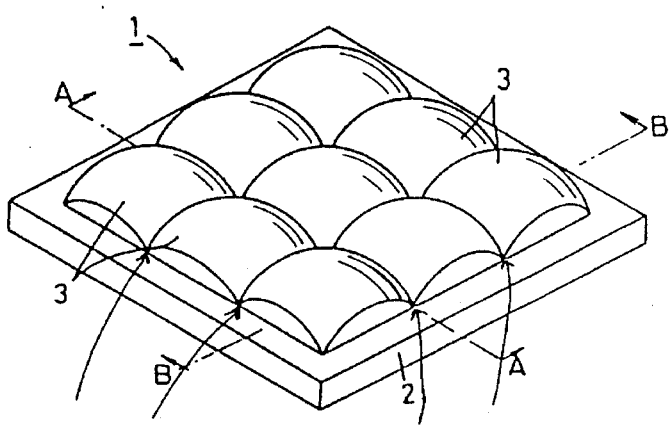
*FIG. 1(A)*
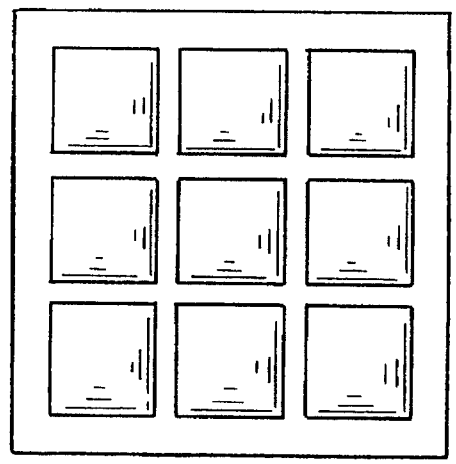
*FIG. 1(B)*
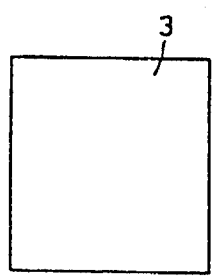 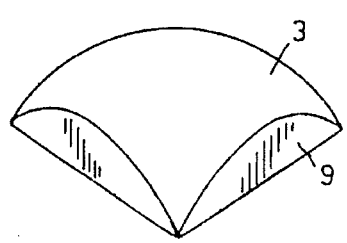 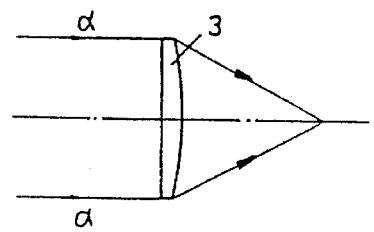
*FIG. 1(C)*   *FIG. 1(D)*   *FIG. 1(E)*

RECTANGULAR BASED CONVEX MICROLENSES SURROUNDED WITHIN A FRAME AND METHOD OF MAKING

FIELD OF THE INVENTION

This invention relates a microlens array, a stamping mold method of producing the microlens array, dot matrix detector, and display devices employing same.

BACKGROUND OF THE INVENTION

Microlens arrays are optical elements comprising a number of microlenses which are arranged in a single plane. It is expected that the demand for these arrays as principal optical elements will increase in the future in fine optics and other fields. Microlens arrays can, for example, be used in liquid crystal TV projectors. Each microlens in the array is arranged to correspond to a single pixel (or display region) of the liquid crystal panel. This particular application demands a microlens array which contains from twenty or thirty thousand to several hundred thousand microlenses in a single plane.

To optimize the efficiency with which the light is used, the microlenses are usually arranged in a dense pattern without spaces between them. However, such an arrangement gives rise to the following problems.

First, there is the problem of dust. The spaces surrounding the planoconvex microlenses are in effect steep-sided valleys in which dust readily accumulates. The dust which adheres to these areas cannot easily be removed with a cloth.

The second problem concerns the AR (anti-reflection) coating which is applied to the surface of each lens to minimize the reflective loss (Fresnel loss) from that surface. For this AR coating, an inorganic substance such as magnesium fluoride is used. This type of AR coating is built up on the surface of the lens by sputtering or deposition. However, the coating has a tendency to accumulate in the valleys between the lenses. As this happens, the AR film in the spaces between the lenses can become so thick that the surfaces of the lenses acquire flat spots.

The third problem concerns the production process. One method by which microlens arrays can be produced is electron beam drawing. However, this method is impractical, as it would take an extremely long time (from several weeks, say, to several months) to draw from twenty or thirty thousand to several hundred thousand microlenses with a diameter of 100 micrometers.

The fourth problem concerns microlense arrays made with round based individual microlenses. If round based microlenses are arranged in a single plane, it is unavoidable that there be regions between the lenses which do not function as lenses, even if the lenses are touching each other. The best effective less ratio which can be achieved when round microlenses are arranged in an array is 80%.

Since the curvature of the lenses in microlens arrays is microscopic, it is difficult to produce them by machining or polishing processes. Stamping is generally believed to be the optimal method for mass-producing microlens arrays. The stamping mold can be produced either by a machining process or by electroforming.

In the machining process, the shapes of the planoconvex microlenses are formed with sharp pointed tools. The portions corresponding to the valleys between individual microlenses are machined as steep-sided protrusions. Since these protrusions are microscopic, the sharp pointed can easily become rounded or damaged during the machining process.

If the stamping mold is electroformed, the surface of a master is made conductive by non-electrolytic plating using a catalyst. The material of the stamping mold is then built up by electrolytic plating, and the completed stamping mold is peeled off the master.

During the electrolytic plating used in this process, the so-called edge effect occurs in the valleys between the lenses, and less material will accumulate in the valley portions than on the other portions, or none at all will be deposited in the valleys. This effect results in the stamping mold not having the desired shape or strength required for manufacturing.

SUMMARY OF THE INVENTION

An object of this invention is to provide an improved microlens array, a stamping mold to make the improved microlens array, and a method of manufacturing the microlens array to solve or at least minimize the problems discussed above.

Another object of the this invention is to provide dot matrix-type detection and display devices employing the microlens array according to the present invention.

In the microlens array according to the present invention, a number of planoconvex microlenses with apertures having at least six sides are arranged on a substrate with spaces between them which do not function as lenses.

In some of the apertures, all of the six or more sides are straight lines, or in other embodiments some of the sides are curved. It is desirable that apertures be chosen which can, as far as possible, provide uniform openings and which will be easy to arrange (i.e., apertures which are-highly efficient in their use of light). The apertures can be arranged in a number of ways such as strips, so that the phases of the rows and columns coincide (i.e., both rows and columns have a regular formation); as a delta arrangement, so that the phase of every row and/or column is shifted by half a period (half a pitch); or randomly, so that at least one phase of a row or column is shifted.

In the optical element designed according to this invention, spaces are provided between the microlenses so that the dust that adheres to the valleys between microlenses can be removed with comparative ease. Since the slopes of these valleys form obtuse rather than acute angles, there is no danger that the lens will acquire flat spots when the AR coating is applied. If a machining process is used to produce the stamping mold, the pressure of the sharp pointed tools will be absorbed by the protrusions, which correspond to the spaces between microlenses. This minimizes the probability that the sharp pointed tools will break or become rounded.

If the stamping mold is electroformed, the obtuse angles of the valleys make it much less likely that the edge effect will be expressed with the result that the shape of the master can be transmitted to the stamping mold more accurately.

The microlens array of this invention is produced in the following way. Small amounts of a fusible base material are placed on a substrate with spaces between them to form a number of lenses, each of which has at least six sides. The base material is melted, causing the surfaces of the lenses to become rounded. The base material is then allowed to harden.

When the base material of the lenses is melted, surface tension causes their surfaces to become rounded. Since spaces are provided between the lenses, the surface tension when the base material is melted causes each to remain in its place so that no two neighboring lenses are fused together. When the melted base material has assumed its rounded shape and been allowed to harden, the microlenses are formed. This invention provides a relatively simple scheme by which microlens arrays can be produced.

The base material for the microlenses can be formed using a common IC production process such as exposing it to light while using a mask or photoresist and then developing it. Thus, a microlens array can be produced with relative ease.

The scheme by which the microlens array of this invention is produced is relatively easy to put in place. Another benefit is that the isotropy of the surface tension acting upon the base material for the lens results in a microlens array with few or almost no point spread aberrations.

This invention provides a scheme for producing a stamping mold optimally suited for the mass production of the microlens array discussed above. This scheme consists of using the microlens array produced according to the scheme outlined above as a master, building up on it layers of the material for the stamping mold, and then removing the master.

This invention also provides a scheme for producing an microlens array using the aforesaid stamping mold. This scheme consists of pouring melted resin into the stamping mold produced according to the scheme outlined above, allowing the resin to harden, and removing the stamping mold. Such a scheme is optimally suited for the mass production of optical elements.

This invention also provides dot matrix-type detection and display devices employing the microlens array according to the present array.

The dot matrix detection device designed according to this invention consists of a device to receive light containing a number of photodiodes whose receptive surfaces are arranged in a single plane with spaces between them; and a microlens array consisting of an array of planoconvex microlenses to convey the beams which strike them to the respective photodiodes mentioned above. The apertures of these microlenses are non-circular. The aforesaid microlenses are arranged in a single plane with spaces between them which do not function as lenses.

The dot matrix display device designed according to this invention consists of a display element on which a number of display areas are arranged in a single plane with spaces between them; a light source which projects light onto the aforesaid display element; and an optical element which is placed between the aforesaid display element and the light source. This optical element comprises a number of planoconvex microlenses with non-circular apertures arranged in a single plane with spaces between them which do not function as lenses. These microlenses convey the light emitted by the aforesaid light source to the respective display areas on the aforesaid display element.

It is desirable that the apertures of the aforesaid microlenses be square or have six or more equal sides.

BRIEF DESCRIPTION OF THE DRAWINGS

FIG. 1(a) is a perspective view of a microlens array according to a preferred embodiment of the present invention.

FIG. 1(b) is a top planer view of the microlens array shown in FIG. 1(a).

FIG. 1(c) is a top planer view of a single microlens from the microlens array shown in FIG. 1(a).

FIG. 1(d) is a perspective view of a single microlens from the microlens array shown in FIG. 1(a).

FIG. 1(e) is a cross-sectional view of the single microlens shown in FIG. 1(a).

DETAILED DESCRIPTION OF THE INVENTION

Figure 2:
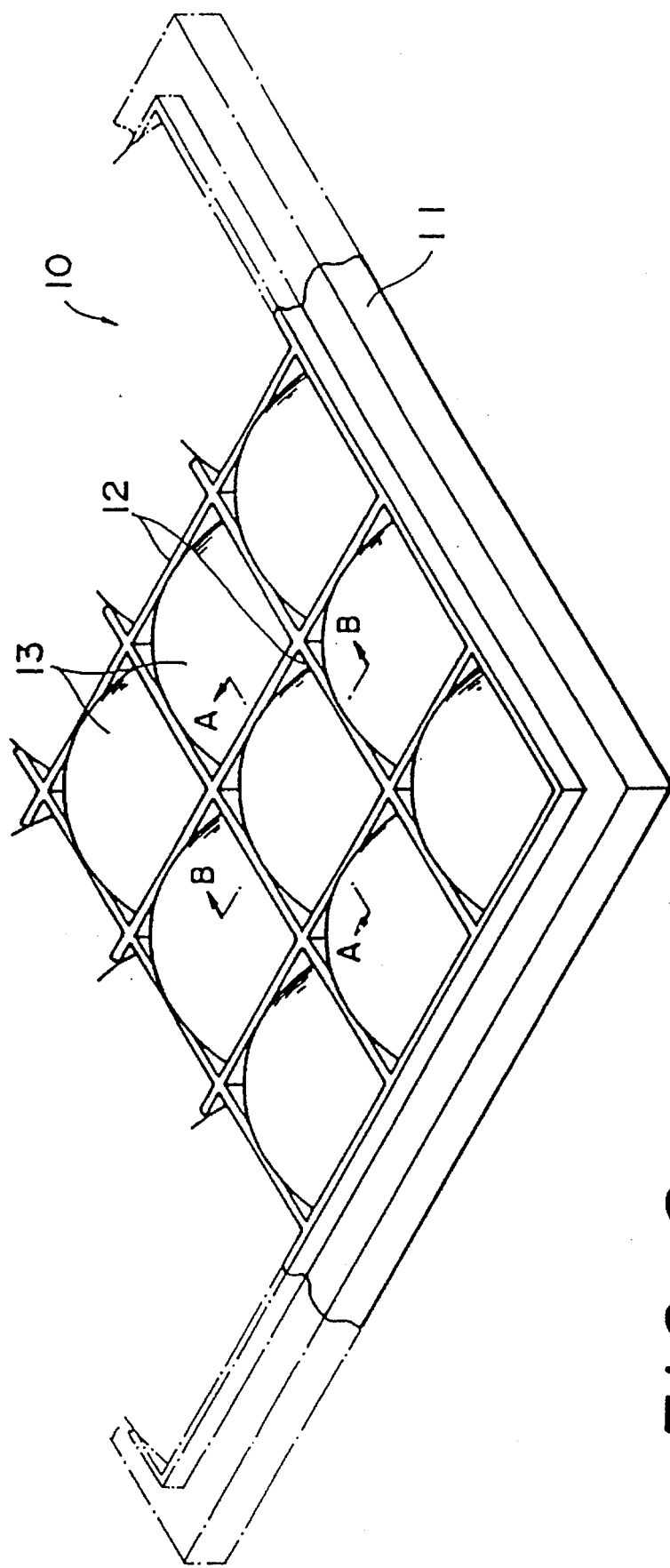
FIG. 2 is a perspective view of a microlens array being manufactured utilizing a frame.

The method of producing a microlens array according to the first embodiment of the present invention is as follows. A number of frames are formed and arranged in a single plane on a substrate. A small amount or element of a fusible base material for a lens is placed in each cell of the frame so that it does not come in contact with the remaining cells. The base material in each cell is melted to form the convex surface of a microlens. The base material is then allowed to harden.

When the base material inside each frame is melted, the spread of the metal is limited by the frame. Thus, the shape of the lens is determined by the shape of the frame. Surface tension causes the surface of the melted base material to acquire a curvature. The surface tension which acts upon the melted base material whose spread is curtailed by the frame is isotropic. Thus, the aforementioned curvature of the surface will be isotropic no matter what shape the frame has.

This results in a microlens with few or almost no point spread aberrations.

The substrate and the frames may be fabricated as a single entity using the same material, or they may be made from different materials.

The frames and the base material for the microlenses can be formed using a common IC production process such as exposing the substrate to light while using a mask or photoresist and then developing it. Thus, a microlens array can be produced with relative ease.

The method of producing a stamping mold for the manufacture of microlens arrays according to the first embodiment is as follows. The microlens array produced according to the method described above is used as a master. The material for the stamping mold is built up on the surface of this master, which is then removed, leaving behind the stamping mold.

This stamping mold can be used to produce microlens arrays. The method to be used is as follows. A liquified resin is poured into the stamping mold produced according to the method described above. When the resin has been allowed to harden, the stamping mold is removed, leaving behind the microlens array.

This method of producing microlens arrays is optimally suited to mass production.

This embodiment also provides the microlens array produced using the method described above and the stamping mold used to produce it.

The microlens array of the first embodiment is composed of a substrate; a number of frames which are formed on the substrate and arranged in a two-dimensional fashion; and a number of lens elements which are formed so that each is in contact with the inside walls of the frame.

The stamping mold of the first embodiment, which is optimally suited for the mass production of microlens arrays, has numerous depressions each of which corresponds to one of the numerous frames arranged in a two-dimensional fashion; and numerous depressions each of which corresponds to a lens element to be formed in the frame so that it comes in contact with that frame.

The shape of the frames is left to the discretion of the user, however, regular shapes such as squares or rectangles are recommended.

In the microlens array designed according to the first embodiment, the only portions which do not function as lenses are the regions where frames are located. Since the walls of the frame can be kept quite thin, the effective lens ratio can be increased. Since this ratio represents the area occupied by the lenses apart from the frames with respect to the total area of the microlens array, it is dependent on the thickness of the frames. However, it should still be possible to increase the ratio to somewhere between 95 and 98%.

This invention also provides a method of producing a microlens which requires simple productions step(s).

The method of producing a microlens according to this invention is as follows. Frames that will surround and define the microlens are formed on a substrate. A quantity of a fusible base material such that it does not come in contact with the frames is placed within those frames. The rounded surface of the microlens is formed by melting the base material within the frames. The melted base material is then allowed to harden.

The scheme by which the microlens is produced according to this invention is relatively easy to put in place. Another benefit is that the isotropy of the surface tension acting upon the base material for the lens results in a microlens with few or almost no point spread aberrations.

The method of producing a stamping mold for the manufacture of microlenses according to this invention is as follows. The microlens array produced according to the method described above is used as a master. The material for the stamping mold is built up on the surface of this master, which is then removed leaving behind the stamping mold.

This stamping mold can be used to mass-produce microlenses. The scheme according to this invention which is suited to mass production is as follows. A liquified resin is poured into the stamping mold produced according to the method described above. When the resin has been allowed to harden, the stamping is removed leaving behind the microlens array.

This invention provides the microlens and stamping mold produced according to the methods described above. BBB 0025. The microlens of this invention consists of a substrate, frame enclosures formed on the substrate, and lens elements formed within these enclosures in such a way as to make contact with the frames.

The stamping mold of this invention which is optimally suited for the mass production of the microlens described above has depressions which correspond to the frame enclosures and depressions which correspond to the lens elements which are to be formed within these enclosures in such a way as to make contact with the frames.

The method of producing a microlens array according to the second embodiment is as follows. Numerous square pieces of fusible base material for lenses are formed on a substrate with spaces between them. These bits of base material are melted causing their surfaces to become rounded, and the melted lumps of base material are allowed to harden.

When the base material of the lenses is melted, surface tension causes their surfaces to become rounded. Since spaces are provided between the lenses, the surface tension when the base material is melted causes each to remain in its place so that no two neighboring lenses are fused together. When the melted base material has assumed its rounded shape and been allowed to harden, the microlenses are formed.

The second embodiment provides a relatively simple scheme by which microlens arrays can be produced. It cannot expect that the surface tension acting upon the melted base material will be perfectly isotropic each time the process is used to produce the microlens array according to the second embodiment. Consequently, the lens characteristics of this array will be slightly inferior to those of the first embodiment. However, the method of the second invention does not require frames so this aspect of the production process is simpler.

This invention provides a method of producing a stamping mold which is optimally suited for the mass production of arrays of square microlenses. This method is as follows. The array of square microlenses produced according to the method described above is used as a master. The material for the stamping mold is built up on the surface of this master, which is then removed leaving behind the stamping mold.

This invention also provides a method of producing a microlens array using the stamping mold described above. This method is as follows. A liquified resin is poured into the stamping mold produced according to the method described above. When the resin has been allowed to harden, the stamping mold is removed leaving behind the array of square microlenses. This production scheme is optimally suited to the mass production of arrays of square microlenses.

This invention also provides the array of square microlenses produced according to the method described above and the stamping mold used to produce it.

The array of square microlenses of the second embodiment consists of a substrate and numerous microlenses which are formed on this substrate. The surfaces of these microlenses which are in contact with the substrate are squares. The microlenses are arranged in a two-dimensional fashion with spaces between them.

The microlens array of the second embodiment consists of square microlenses which are arranged with spaces between them. Since these microlenses are square, the area of the substrate occupied by the spaces between them is smaller than that occupied by the space between round microlenses or those with other shapes. Using square lenses improves the effective aperture ratio. In summary, if the microlens arrays could be comprehensively defined, the microlens arrays designed according to both the first and second embodiments pertain to a microlens array consisting of a number of planoconvex lenses with non-circular apertures, arranged in a single plane with spaces between them which do not function as lenses.

A detailed explanation of embodiments of the invention will now be described.

FIGS. 1(a) to 1(e) show details of a microlens array which is a preferred embodiment of this invention.

In FIG. 2, a microlens array 10 consists of substrate 11; a number of frames 12 which are formed on substrate 11 and arranged in a two-dimensional fashion; and a number of microlens elements 13, which are formed so that each is in contact with the inside walls of a frame 12. Substrate 11, frames 12 and microlens elements 13 are all formed of a transparent substance.

The sides of frames 12 are parallel to the length and breadth of the substrate, so their corners form right angles. The frames 12 in this embodiment appear rectangular when viewed from overhead, however, the user may choose to make them square, triangular, hexagonal, or some other shape. Ideally, frames 12 should be shaped so that with the exception of the edges there is no space on the substrate which is not occupied by a frame 12 or a microlens element 13. Frames 12 should be as thin as possible to minimize the surface area of substrate 11 which they occupy.

Figure 3A:
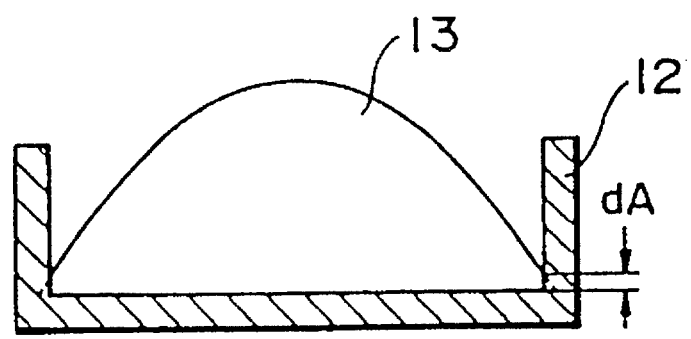
FIGS. 3(A) and 3(B) are cross-sectional views of the frame taken along A—A and B—B, respectively, in FIG. 2.
Figure 3B:
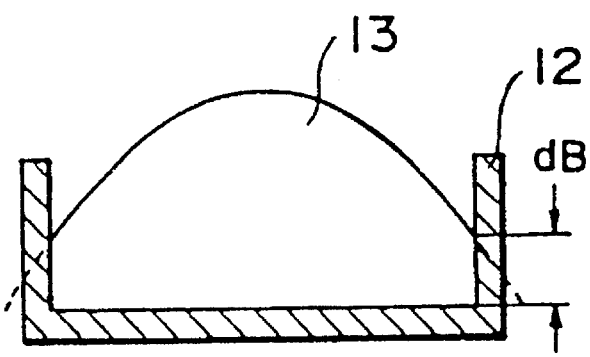

FIGS. 3(A) and (B) show longitudinal and latitudinal cross sections of frame 12 and microlens element 13 within the frame 12. The curvature of microlens element 13 is a convex surface that is isotropic despite the fact that the longitudinal and latitudinal sides of frame 12 are of different lengths. That is to say, the cross sections of microlens element 13 shown in FIGS. 3(A) and (B) are identical. For this reason, the height Da of the portion of the frame in contact with microlens element 13 is lower in the direction of the longer cross section than the height Db of the portion in contact with element 13 in the direction of the shorter cross section.

An example of such a microlens array 10 is given below. The substrate 11 is a glass substrate. Frames 12 and microlens elements 13 are formed from photoresist or resin (a UV-hardening resin, for example), and each frame 12 is 120 μm×94 μm, with a thickness of 2 μm. The array contains 235,200 microlens elements (480×490).

The effective aperture ratio of this microlens array 10 (i.e., the ratio of the surface area occupied by the microlens elements versus the surface area occupied by the frames and elements together) is over 96%.

FIG. 4 illustrates the process used to produce the aforesaid microlens array 10. The parts of the drawing which correspond to parts shown in FIG. 2 have been given the same numbers with an added "A". For example, substrate 11 is here labeled substrate 11A.

Figure 4A:
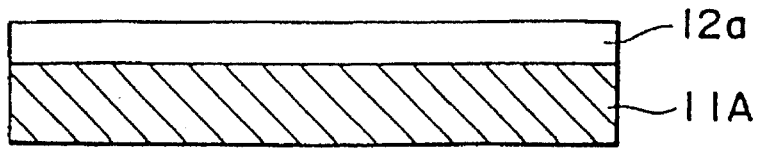
FIGS. 4(A) to 4(G) are cross-section views illustrating the production process used to produce a microlens array or a master for it.

A coating of negative-type photoresist 12a is applied to the surface of glass substrate 11A (FIG. 4(A)).

Figure 4B:
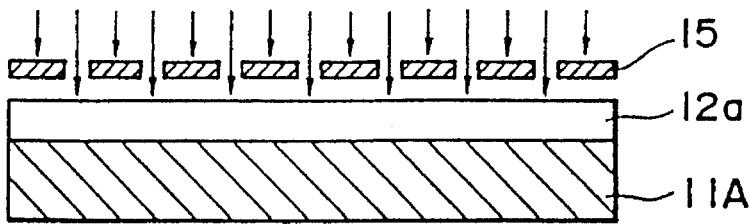

Mask 15, whose transparent portions correspond to the shapes which the frames are to assume, is laid over the substrate, and photoresist 12a is exposed (FIG. 4(B)).

Figure 4C:
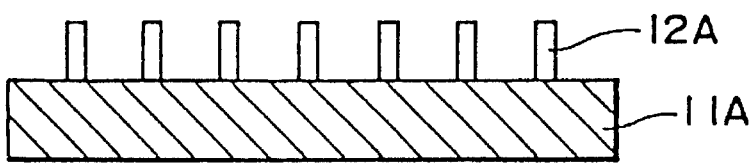

After being exposed, the photoresist is developed, and frames 12A, which consist of photoresist, remain on the surface of substrate 11A (FIG. 4(C)). If necessary, the substrate can be irradiated with deep UV light (i.e., short-wavelength UV light) to harden photoresist frames 12A. This process is known as a deep UV cure or deep UV hardening.

The entire surface of substrate 11A is coated with positive-type photoresist 13a so that frames 12A are covered by it.

Mask 16, whose opaque portions correspond to the shapes which the bits of base material for the lenses are to assume, is laid over the substrate so that each opaque portion is positioned in the center of a frame 12A. Photoresist 13a is then exposed (FIG. 4(E)).

After being exposed, the photoresist is developed, and base material portions 13b, which consist of photoresist, remain inside frames 12A on the surface of substrate 11A. The photoresist is then irradiated with near UV rays (long-wavelength UV light) to lower the melting point of base material portions 13b (FIG. 4(F)).

Figure 4D:
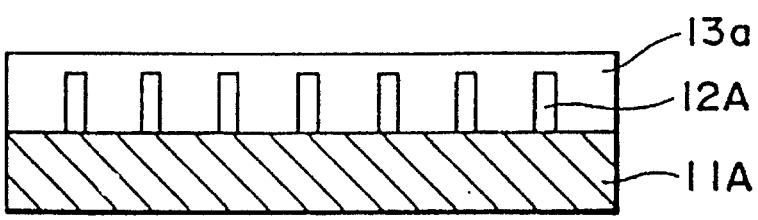
Figure 4E:
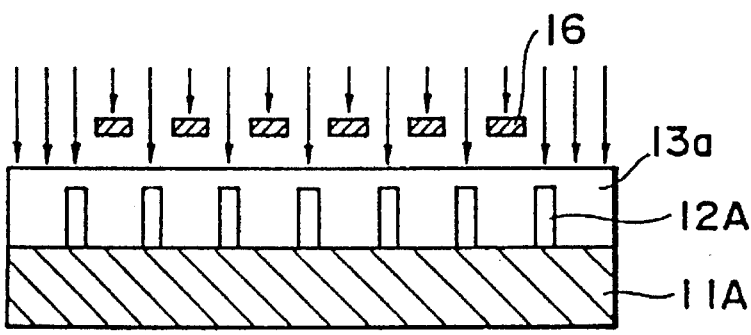
Figure 4F:
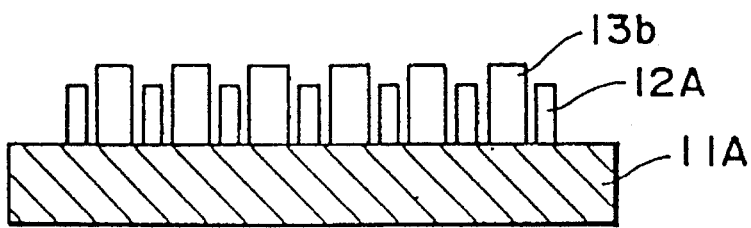
Figure 4G:
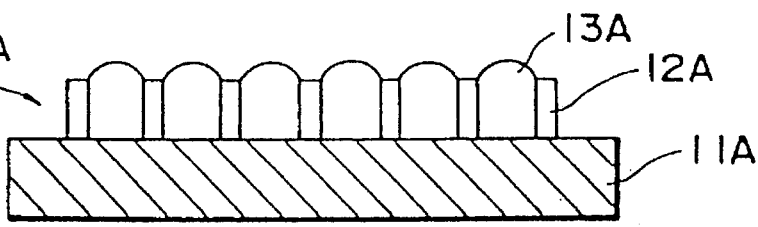

Finally, the entire apparatus is baked, causing base material portions 13b to melt (FIG. 4(G)). Portions 13b spread out inside frames 12A, and surface tension causes their surfaces to protrude upward and become curved. In this way microlens elements 13A are formed in frames 12A. If left at normal ambient temperature, microlens elements 13A will harden.

Figure 6:
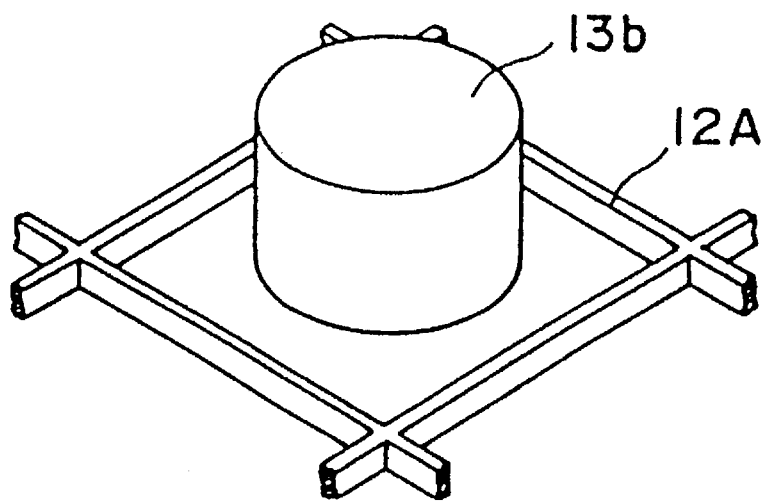
FIG. 6 is a perspective view of an individual base material element positioned inside its frame.

This completes the production of microlens array 10A. FIG. 6 shows the condition of the substrate when the process shown in FIG. 4(F) has been completed. Here the portions 13b formed inside frames 12A are cylindrical columns; but they could alternatively be square columns or have some other shape selected by the user. Ideally, portions 13b do not come in contact with frames 12A.

Figure 7:
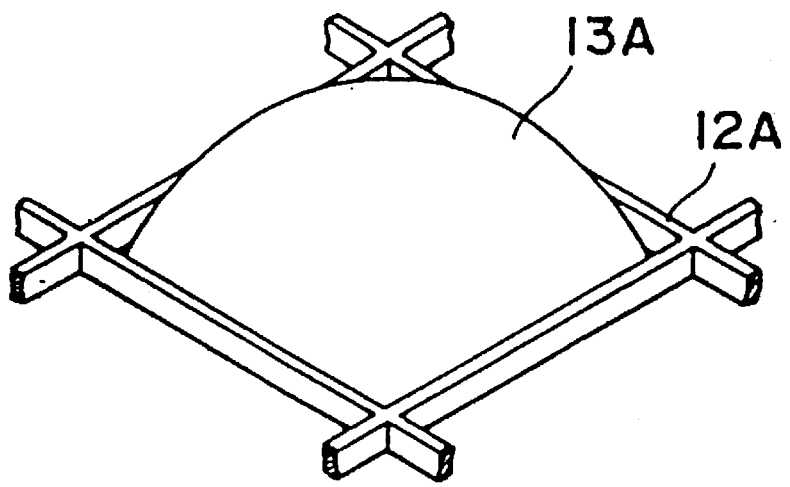
FIG. 7 is a perspective view of an individual microlens formed in its frame.

FIG. 7 shows newly formed microlens 13A and frame 12A when the process shown in FIG. 3(G) has been completed. Base material portion 13b is heated to its melting point. It spreads out within frame 12A until its edges come in contact with the frame. The spread of the melted base material 13b is checked by frame 12A. Since the surface tension of the liquid material 13b is isotropic, the curvature of the lens which it forms will also be isotropic. In other words, longitudinal and latitudinal cross sections of the lens will be identical, as was explained earlier with reference to FIGS. 3(A) and (B). This scheme, then, produces a microlens with few or virtually no point spread aberrations, making it an excellent condenser.

In the microlens discussed above, it would also be possible to form frames 12A and substrate 11A at the start of the process as a single entity. For example, after the completion of the process shown in FIG. 4(C), a stamping mold of nickel or some other type of material could be electroformed on substrate 11A, which already has frames 12A attached to it. The stamping mold, then, would have depressions on it in the shape of the frames. Resin would then be poured into the space between the stamping mold and a new substrate and allowed to harden. When the stamping mold is peeled off, the frames would be formed as a single entity with the resin on the surface of the substrate. It would also be possible to form the frames and the substrate itself as a single piece of resin.

Alternatively, it would be possible to form both frames 12A and base material portions 13b from positive-type photoresist. In the process shown in FIG. 4(A), positive-type photoresist would be applied to the surface of substrate 11A. In the process shown in FIG. 4(B), a mask whose opaque portions corresponded to the shapes the frames were to assume would be laid over the substrate and the photoresist would be exposed. When the surface was developed, the frames of photoresist would remain on the surface of substrate 11A, as shown in FIG. 4(C). These frames would be irradiated with deep UV light to harden them. This deep UV cure would render the photoresist frames impervious to the light to which they would be exposed in the process shown in FIG. 4(E). Subsequent processes would be identical to those shown in FIGS. 4(D) through (G). An electron beam (EB) resist could also be used instead of a photoresist. In this case the surface would be exposed to electron beams instead of light.

The microlens array 10A which is produced as described above can be used just as it is. Ideally, the said array 10A would be used as a master to create a stamping mold, which could then be used to mass-produce microlens arrays.

Figure 5H:
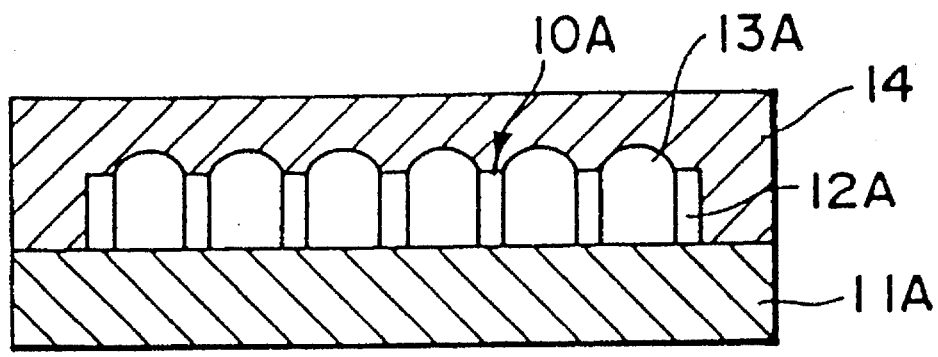
FIGS. 5(H) to (5(J) are cross-sectional views illustrating the production process used to produce a stamping mold for the manufacture of microlens arrays and that used to produce microlens arrays using this stamping mold.
Figure 5I:
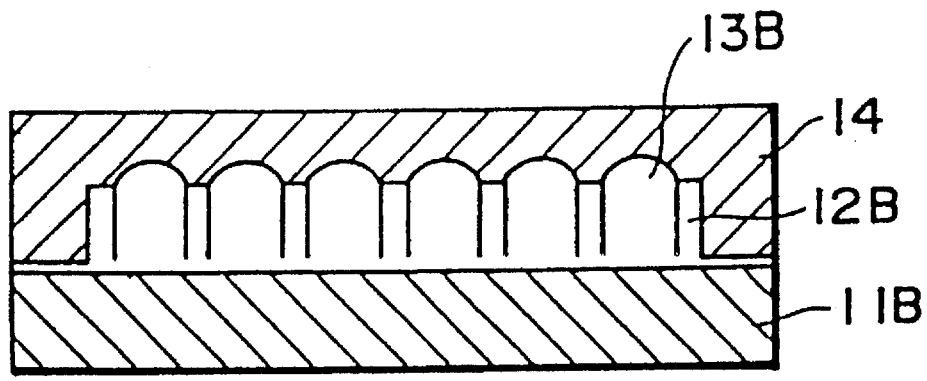
Figure 5J:
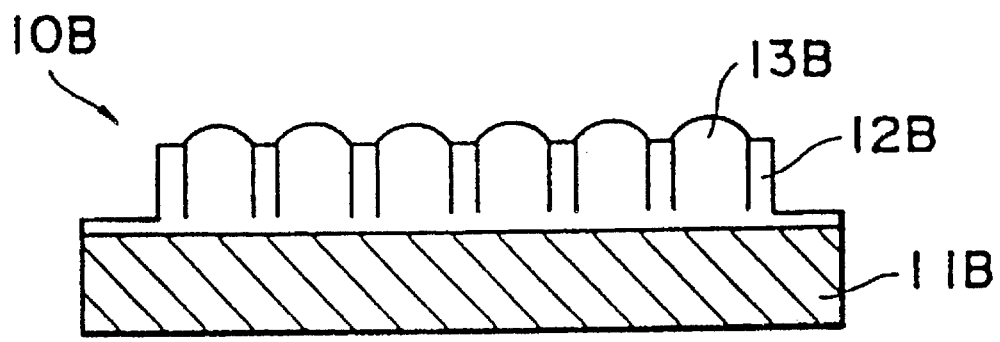

The processes used in the production of this stamping mold and the production of a microlens array using this stamping mold are pictured in FIG. 5.

Microlens array 10A is used as a master on whose surface nickel or some other substance is accumulated by electroforming. In this way nickel stamping mold 14 is formed (FIG. 5(H)). Stamping mold 14 is then separated from master 10A. Stamping mold 14 has depressions whose shapes correspond to those of frames 12a and other depressions whose shapes correspond to those of microlenses 13A.

Liquified resin is poured between the indented surface of the stamping mold 14 produced in this way and substrate 11B, a plate of glass or some similar material which has been specially prepared. The appropriate pressure is applied to the region between the stamping mold and the plate, and the resin is allowed to harden. If a UV-hardening resin is used, ultraviolet rays can be projected through the plate to set the resin. Frames 12b are formed by the resin which fills the first group of aforementioned depressions in stamping mold 14, and microlens elements 13B by the resin which fills the second group of depressions (FIG. 5 (I)).

Stamping mold 14 is removed at the completion of this process, leaving microlens array 10B, which consists of substrate 11B, on which frames 12B are formed. Within each frame 12B is a microlens element 13B (FIG. 5(J)). This microlens array 10B is identical to microlens array 10A described above, and can be utilized in the same manner.

Stamping mold 14 can be used to mass-produce microlens array 10B.

The microlens arrays 10A and 10B produced in this manner both have the appearance of array 10 shown in FIG. 1.

In the embodiment described above, numerous frames are formed on a single substrate, and a microlens element is formed inside each of the frames. Alternatively, a single frame (a walled enclosure) could be formed on a substrate, and a single microlens element could be formed in this frame. The method of producing this single microlens or a master for it, the method of producing a stamping mold for its mass production, and the method of producing a microlens using this stamping mold would all be identical to the methods described above with reference to FIGS. 4 and 5.

Figure 8:
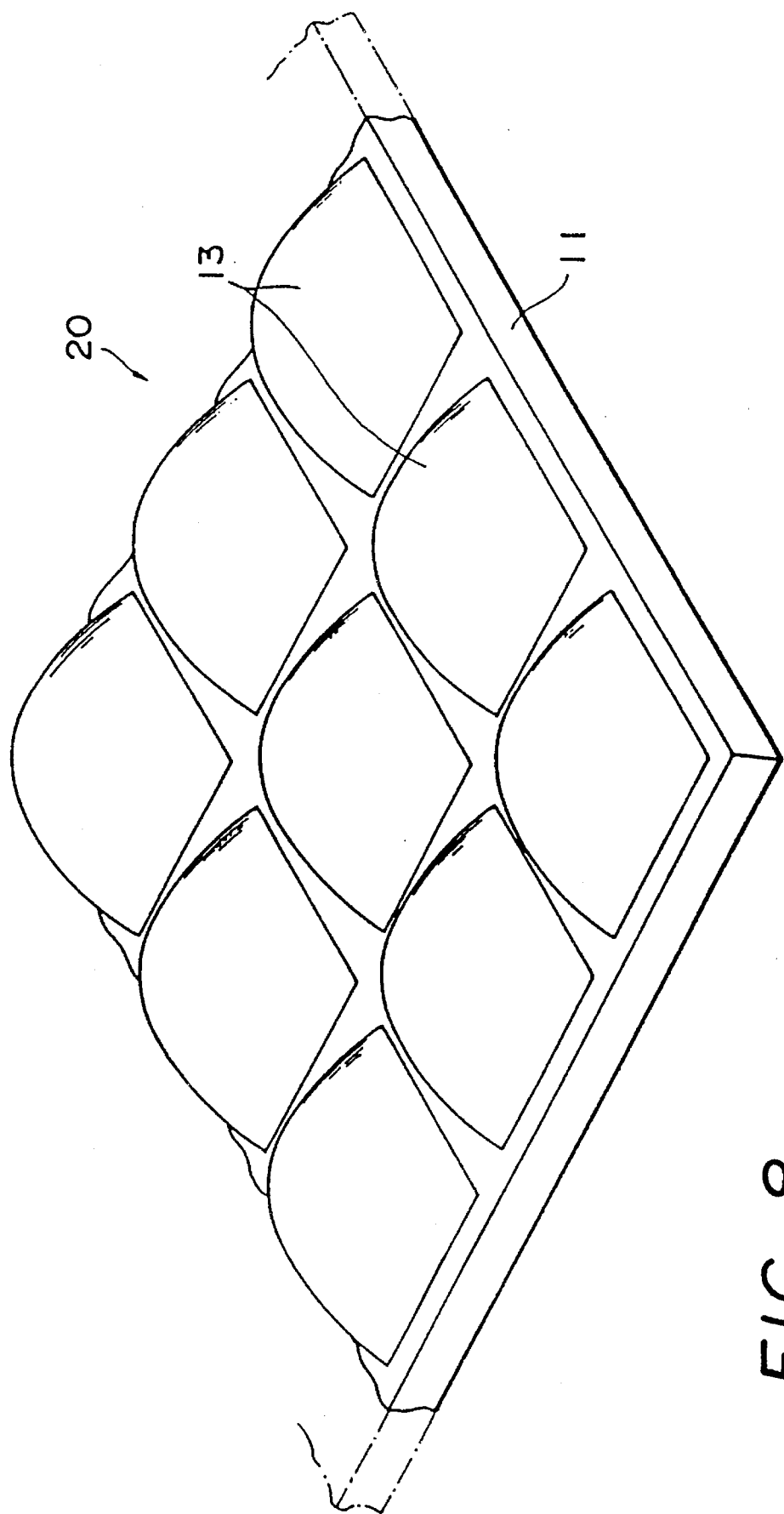
FIG. 8 is a perspective view of a portion of the array of square microlenses, which is a second preferred embodiment of this invention.

FIG. 8 shows a second preferred embodiment of this invention of an array of square microlenses. Features of this drawing which are identical to those in FIG. 2 are given the same numbers.

Microlens array 20 shown in FIG. 8 differs from microlens array 10 shown in FIG. 2 in that it has no frames. The square microlens elements 13 which comprise microlens array 20 are arranged in a regular fashion both latitudinally and longitudinally with small spaces between them.

This type of microlens and a master for it can be produced by the processes shown in FIGS. 4(D) and (E). The only point in which their production differs from that of microlens array 10A is that the process by which the frames are produced is dispensed with.

Photoresist 13a is applied to the surface of substrate 11A. A mask whose opaque portions correspond to the areas where the square microlens elements are to be formed (assuming a positive-type photoresist is used) is laid over the substrate. Photoresist 13a is then exposed and subsequently developed.

Figure 9:
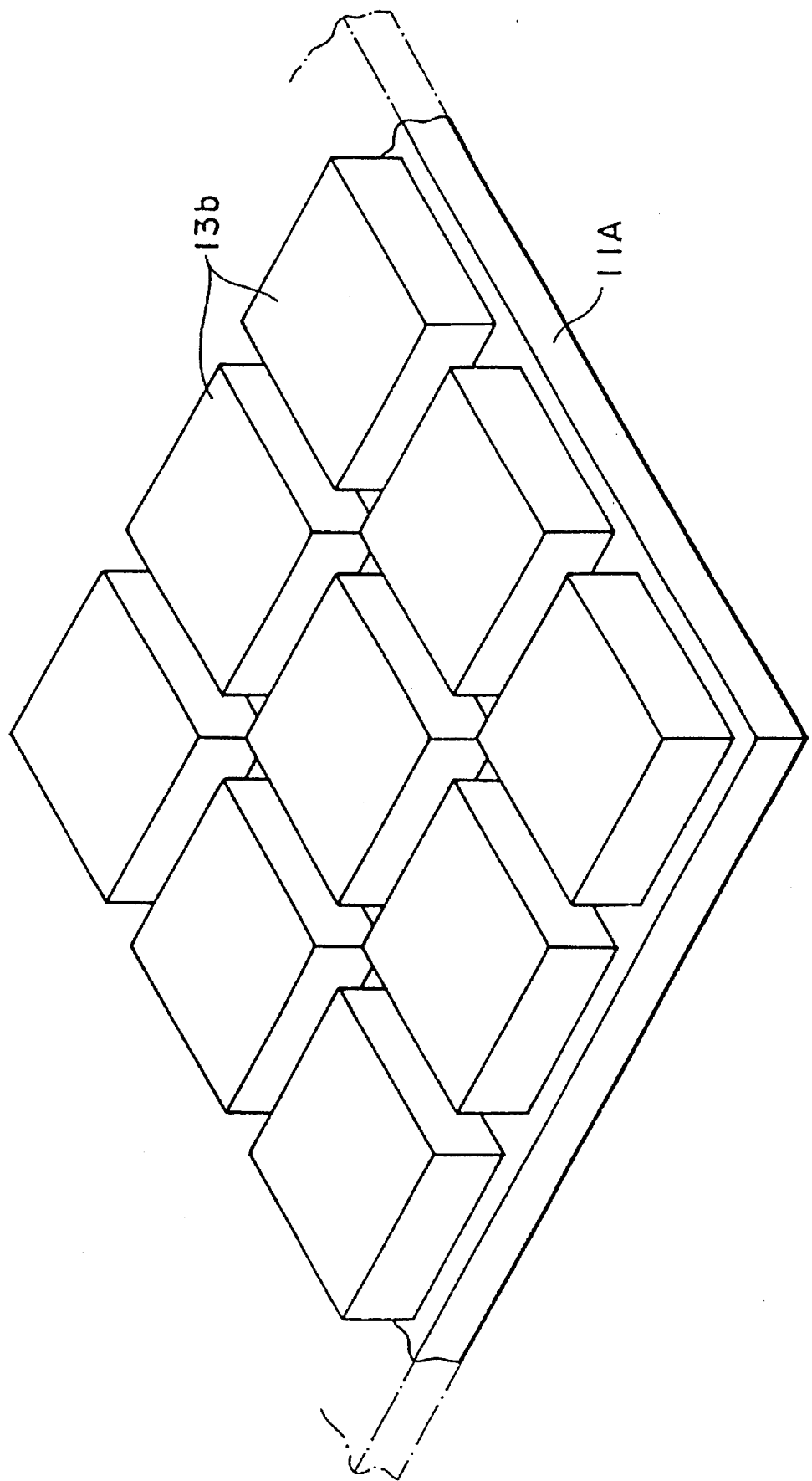
FIG. 9 is a perspective view showing the appearance of the substrate when the square portions of base material have been formed on its surface during the production of an array of square microlenses.

The appearance of the unfinished microlens array after the photoresist has been developed is shown in FIG. 9. As seen from above, square base material portions 13b are arranged in a regular formation both longitudinally and latitudinally, with small spaces left between them. If necessary, the melting point of base material 13b can be lowered by irradiating portions 13b with near UV light. The substrate is then baked, causing base material portions 13b to melt. Surface tension causes the surface of each liquid portion 13b to become rounded and prevents the portions from running. The spaces between base material portions 13b prevent neighboring portions 13b from fusing together as they melt. When portions 13b are allowed to harden, the array of square microlenses or the master for its production is completed.

When this master is used to produce a stamping mold or the stamping mold is used to mass-produce an array of square microlenses, the processes are the same as those shown in FIG. 5.

An alternative process by which base material portions 13b can be produced is to begin by forming supports for portions 13b and then hardening these supports by irradiating them with deep UV rays. Base material portions 13b can then be formed on these supports.

Figure 10:
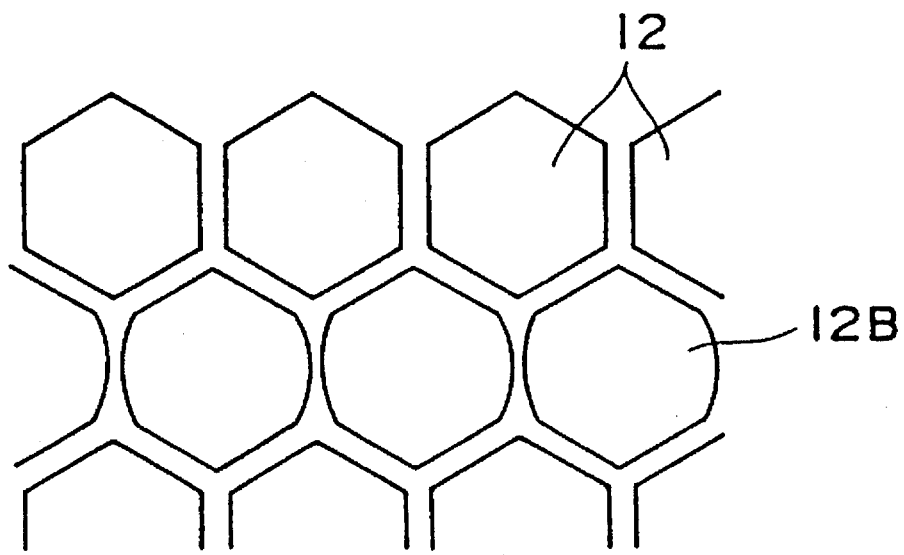
FIG. 10 is a top planar view showing a modified version having hexagonal apperatures.
Figure 11:
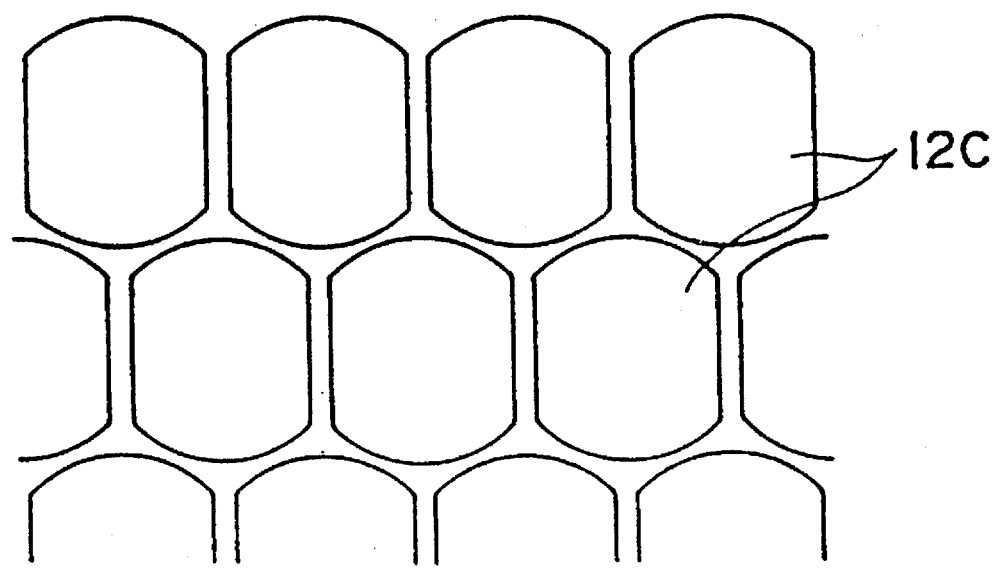
FIG. 11 is a top planar view showing another modified version of apperatures.
Figure 12:
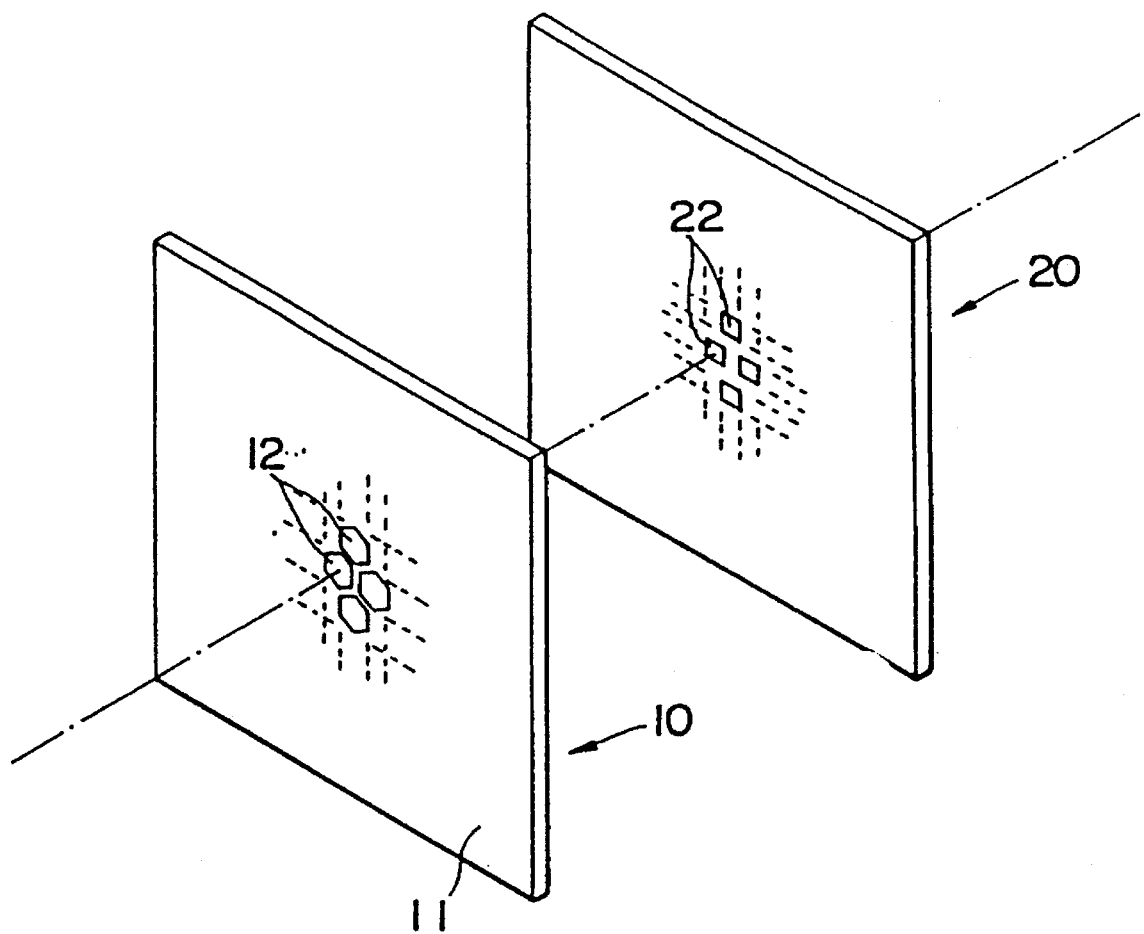
FIG. 12 is a perspective view showing the basic configuration of a dot matrix-type detection device.

In various embodiments of the present invention, the apertures can have different shapes, for example, as shown in FIGS. 10 and 11. In these embodiments, all of the six or more sides are straight lines, or the sides are curved. It is desirable that apertures be chosen which can, as far as possible, provide uniform openings and which will be easy to arrange (i.e., apertures which are highly efficient in their use of light). The apertures can be arranged in a number of ways such as strips, so that the phases of the rows and columns coincide (i.e., both rows and columns have a regular formation); as a delta arrangement, so that the phase of every row and/or column is shifted by half a period (half a pitch); or randomly, so that at least one phase of a row or column is shifted. FIG. 12 shows a third embodiment of the present invention directed to a dot matrix-type detection device in which a microlens array can be employed.

This detection device consists of the aforesaid microlens array 10 and photodetector device 20. Device 20 comprises a number of photodetector elements whose receptive surfaces 22 are arranged in positions to correspond with the positions of planoconvex microlens elements 12 in microlens array 10. Each receptive surface 22 of a photodetector corresponds with a single microlens element 12. The incident light is condensed and collimated by microlens elements 12 and conveyed to the receptive surfaces 22 of the photodetector elements.

Figure 13:
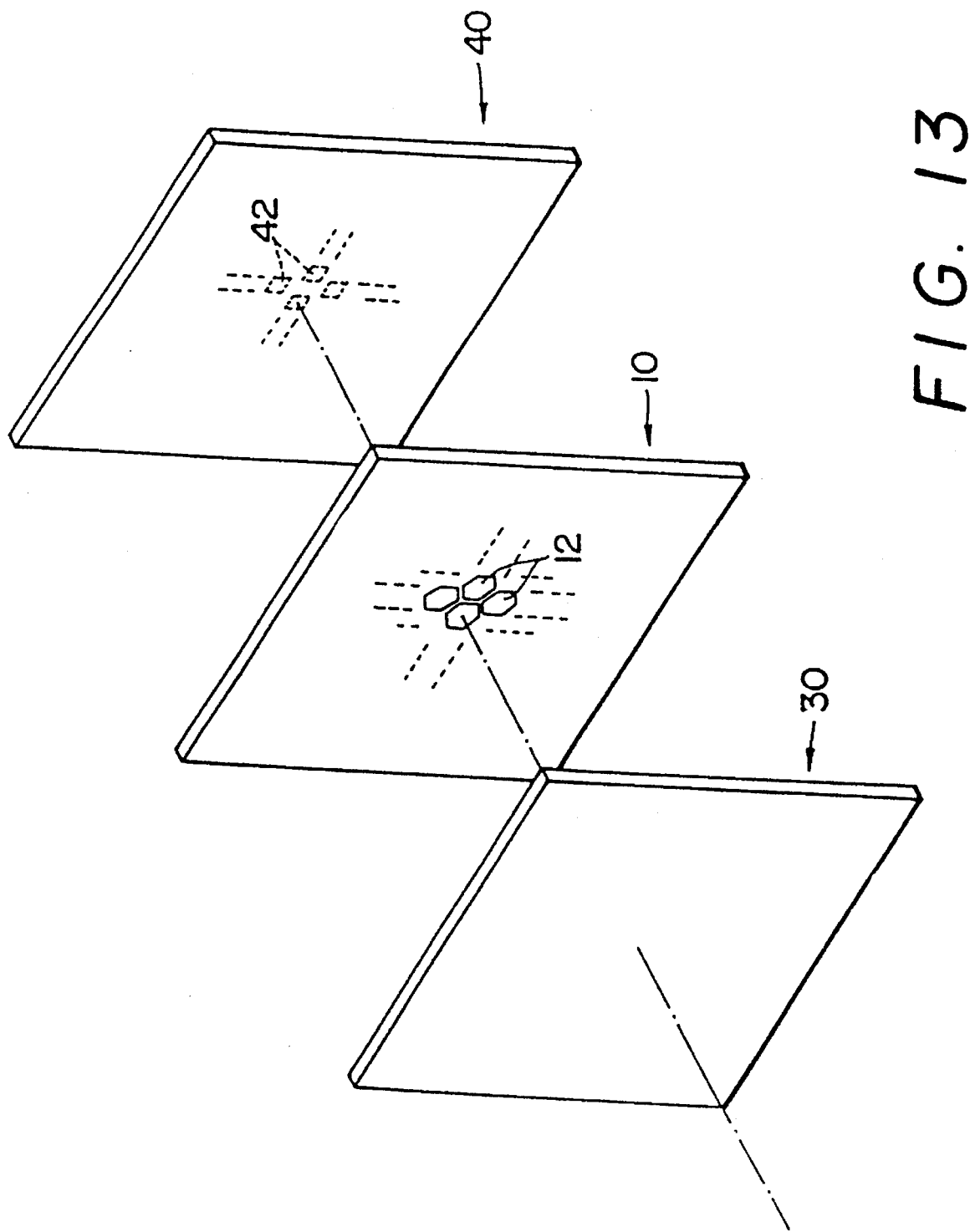
FIG. 13 is a perspective view showing the basic configuration of a dot matrix-type display device.

A fourth embodiment of the present invention is shown in FIG. 13, which shows another application for a microlens array according to the present invention, namely, a dot matrix-type display device, and more specifically, a liquid crystal display device.

This dot matrix-type display device consists of light source 30, microlens array 10 and liquid crystal panel 40. As is well known, panel 40 has numerous display areas 42 where the transmissivity with regard to light is controlled by an external signal. Each display area 42 has what is known as a pixel electrode. Display areas 42 are isolated from each other by means of light-obstructing membranes (a black matrix). Scanning electrodes and signal electrodes run in the portions where the membranes are formed.

The display areas 42 on liquid crystal panel 40 have a one-to-one correspondence to planoconvex microlens elements 12 in the microlens array. The light from light source 30 is condensed by microlens elements 12 and conveyed to each of the corresponding display areas 42.

Figure 14:
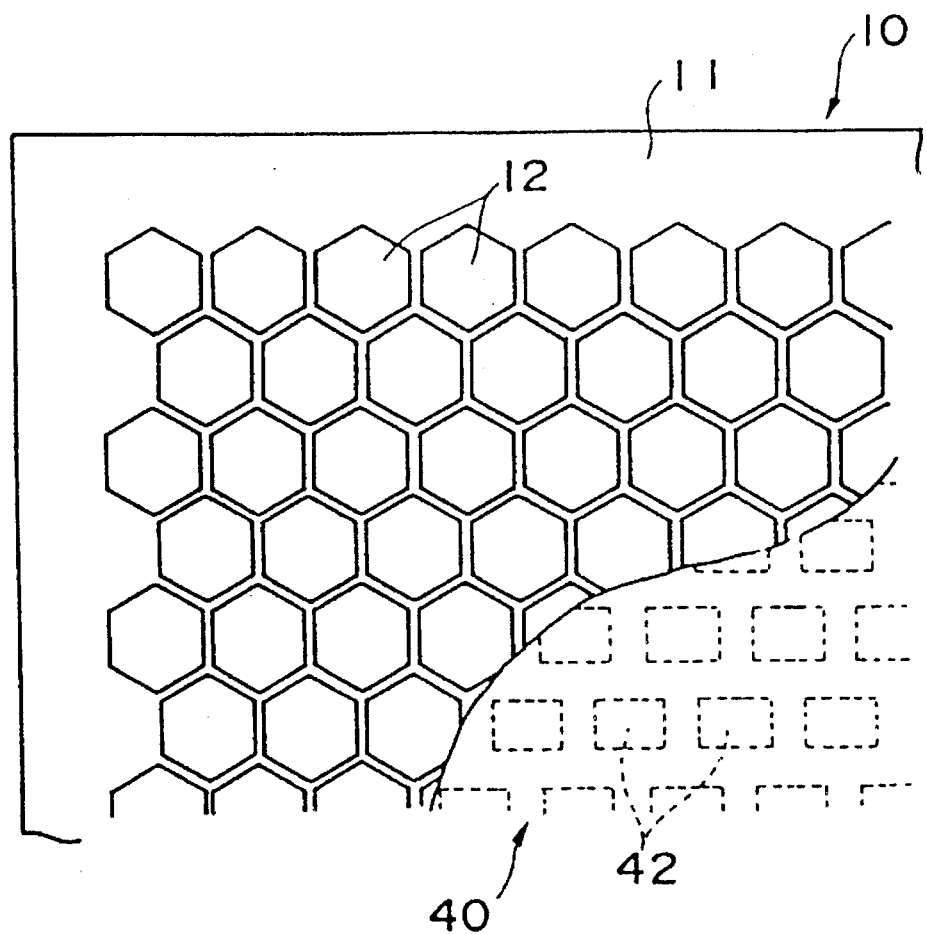
FIG. 14 is a partially cut away top planar view of a dot matrix-type display device.
Figure 15:
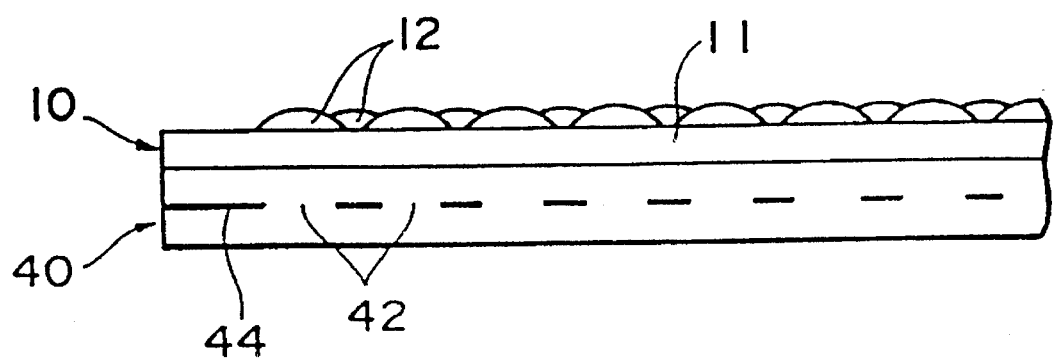
FIG. 15 is a cross-sectional view of the dot matrix-type display device shown in FIG. 14.

FIGS. 14 and 15 show an example of a display device in which liquid crystal panel 40 and microlens array 10 have been fashioned as a single entity. FIG. 14 shows a partially cut away plan view, and FIG. 15 shows a cross section.

To allow display areas 42 to be visible, only one light-obstructing membrane 44 is pictured. The finer details are omitted from the drawing.

The microlens elements in the arrays shown in FIGS. 12 through 14 can alternatively be fashioned as squares, and they can be arranged in stripes or some other formation.

Figure 16:
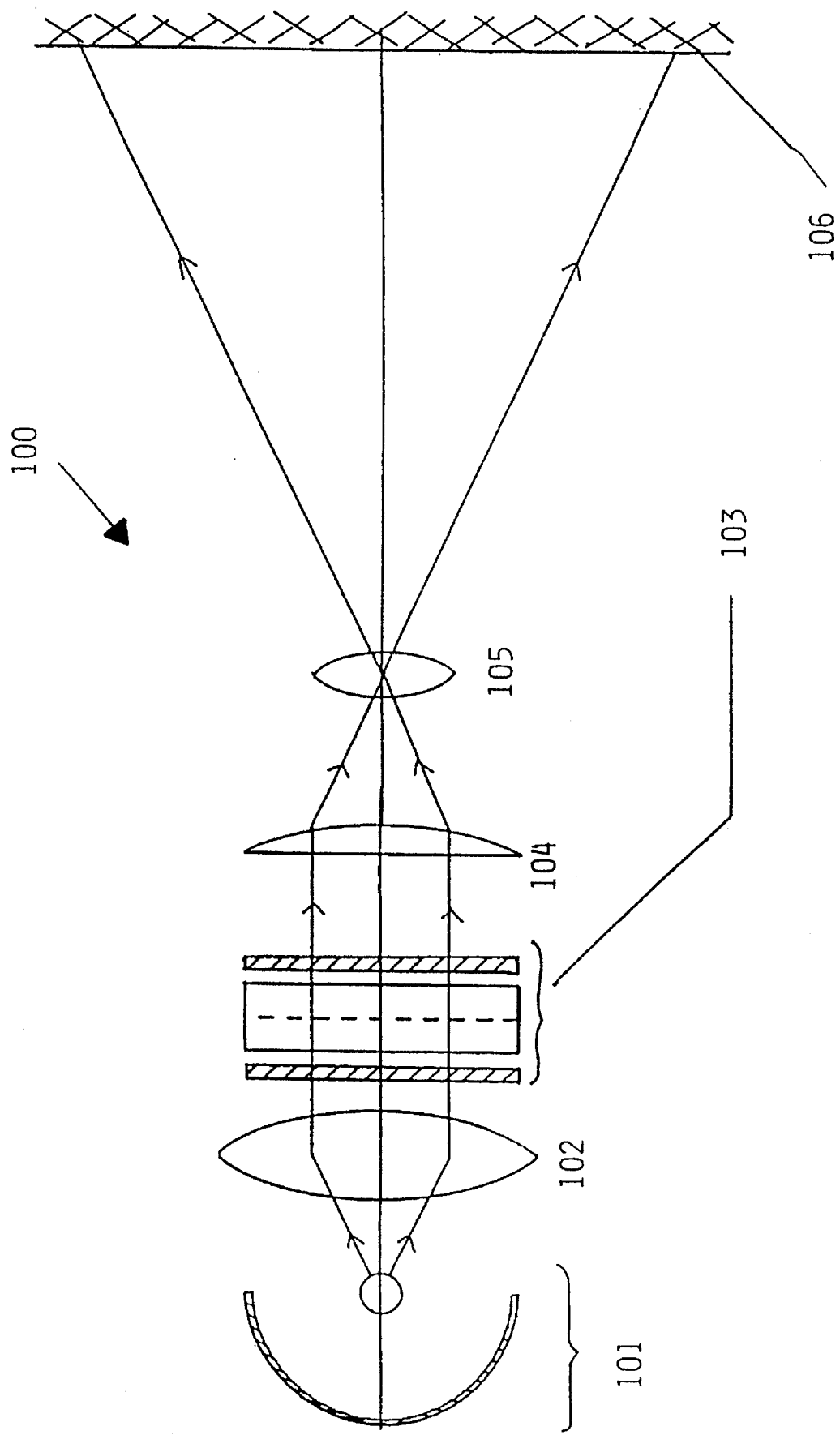
FIG. 16 is diagramic view of liquid crystal projection device.

FIG. 16 illustrates the microlens array according to the present invention implemented in a liquid crystal projector 100. The projector 100 comprises a light source 101, a condersor lens 102, a liquid crystal display element 103, lens 104, lens 105, and screen 106.

Figure 17:
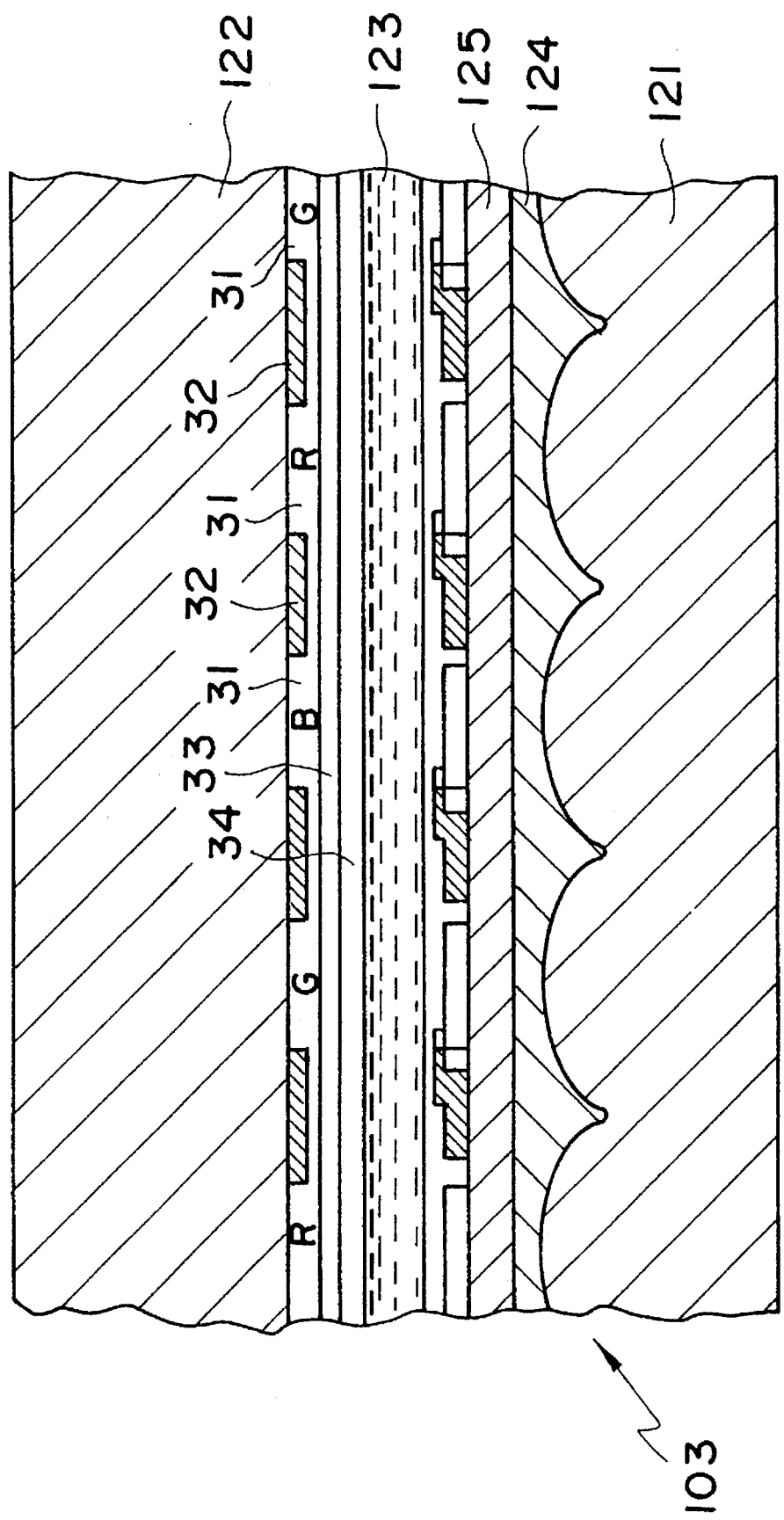
FIG. 17 is a detail cross-sectional view of a liquid crystal display device.

FIG. 17 is a detailed view of the liquid crystal display element 103, as shown in FIG. 16. The liquid crystal display element 103 comprises a microlens array 121, a bonding layer 124, a glass substrate 125, liquid crystal 123, and a glass substrate 122. The liquid crystal display element 103 is an integrated one-piece arrangement after assembly.

What is claimed is:

1. A microlens array, comprising:
a plurality of spaced apart individual microlenses separated by valleys and positioned in a single plane, said microlenses being arranged to define a plurality of spaced apart light apertures through said plane, said microlenses each having a convex surface and a rectangular base; and
a frame provided around each individual microlens to maintain spacing between individual microlenses.

2. A microlens array according to claim 1, wherein said individual microlenses are arranged in rows and columns defining a matrix of spaced apart individual microlenses.

3. A microlens array according to claim 1, wherein said individual microlenses are spaced apart from other individual microlenses by valleys having obtuse angle slopes.

4. A microlens array according to claim 1, wherein said individual microlenses have square bases.

5. A microlens array according to claim 1, wherein said apertures are rectangular.

6. A liquid crystal display element, comprising:
a microlens array, said microlens array comprising a plurality of spaced apart individual microlenses positioned in a single plane and arranged to define a plurality of spaced apart light apertures through said plane, said microlenses each having a convex surface and a rectangular base, and a frame provided around each individual microlens to maintain spacing between individual microlenses;
a transparent substrate provided on one side of said microlens array;
a bonding layer positioned between said microlens array and said transparent substrate;
a backing substrate;
liquid crystal contained between said transparent substrate and said backing substrate; and
electrodes positioned between said transparent substrate and said backing substrate in said liquid crystal for activating the liquid crystal.

7. A liquid crystal display element according to claim 6, wherein said individual microlenses are arranged in rows and columns defining a matrix of spaced apart individual microlenses.

8. A liquid crystal display element according to claim 6, wherein said individual microlenses are spaced apart from other individual microlenses by valleys having obtuse angle slopes.

9. A liquid crystal display element according to claim 6, wherein said apertures are square shaped.

10. A liquid crystal display element according to claim 6, wherein said individual microlenses have square bases.

11. An image display device, comprising:
a liquid crystal display element comprising;
a microlens array, said microlens array comprising a plurality of spaced apart individual microlenses positioned in a single plane and arranged to define a plurality of spaced apart light apertures through said plane, said microlenses each having a convex surface and a rectangular base, and a frame provided around each individual microlens to maintain spacing between individual microlenses;
a transparent substrate provided on one side of said microlens array;
a bonding layer positioned between said microlens array and said transparent substrate;
a backing substrate; liquid crystal contained between said transparent substrate and said backing substrate;
electrodes positioned between said transparent substrate and said backing substrate in said liquid crystal for activating the liquid crystal;
a light source to generate the light which is projected onto said liquid crystal display element; and
display screen, said liquid crystal display element positioned between said light source and said screen.

12. An image display device according to claim 11, wherein said individual microlenses are arranged in rows and columns defining a matrix of spaced apart individual microlenses.

13. An image display device according to claim 11, wherein said individual microlenses are spaced apart from other individual microlenses by valleys having obtuse angle slopes.

14. An image display device according to claim 11, wherein said apertures are square shaped.

15. An image display device according to claim 11, wherein said said microlenses having square bases.

16. A method of producing a microlens array comprising a plurality of spaced apart individual microlenses positioned in a single plane and arranged to define a plurality of spaced apart light apertures through said plane, said microlenses each having a convex surface and a rectangular base, comprising the steps of:

provinding a plurality of rectangular frames on a planar substrate;

placing fusible base material for the microlens into each cell defined by said frame;

melting said fusible base material causing its surface to become curved to define microlenses each having a convex surface and rectangular base; and projecting ultraviolet rays to said fusible base material causing it to harden.

17. A method of producing a microlens array according to claim 16, in which the frames are removed after the base material for the lenses has hardened.

18. A method of producing a microlens array comprising a plurality of spaced apart individual microlenses positioned in a single plane and arranged to define a plurality of spaced apart light apertures through said plane, said microlenses each having a convex surface and a rectangular base, comprising the steps of:

providing a plurality of spaced apart rectangular pieces of fusible base material for lenses on a substrate;

melting said fusible base material causing its surface to become curved to define microlenses each having a convex surface and a rectangular base; and projecting ultraviolet rays to said fusible base material causing it to harden.

19. A light receiving element, comprising:

a microlens array, said microlens array comprising a plurality of spaced apart individual microlenses positioned in a single plane and arranged to define a plurality of spaced apart light aperatures through said plane, said microlenses each having a convex surface and a rectangular base, and a frame provided around each individual microlens to maintain spacing between individual microlenses;

a backing substrate;

a plurality of light detection elements located on said backing substrate; and liquid crystal disposed between said microlens array and said backing substrate forming an integrated assembly, wherein said light detection elements are arranged in the same configuration and aligned with said individual microlenses.

\* \* \* \* \*